United States Patent [19]

Barry, Leonard D.

[11] Patent Number: 4,746,257
[45] Date of Patent: May 24, 1988

[54] ROAD-RAIL TRAILER AND CONTAINER TRANSFER SYSTEM

[76] Inventor: Barry, Leonard D., 19300 Pennington, Detroit, Mich. 48221

[21] Appl. No.: 740,368

[22] Filed: Jun. 3, 1985

[51] Int. Cl.⁴ .............................................. B65G 67/02
[52] U.S. Cl. ..................... 414/392; 414/337; 414/744 R; 414/917; 414/785; 414/340; 414/344; 414/399; 198/480.1; 104/18; 104/49
[58] Field of Search ............... 414/390, 391, 401, 392, 414/785, 373, 786, 787, 374, 362, 334, 335, 336, 337, 338, 389, 339, 340, 341, 342, 343, 344, 917, 744 R, 399, 584, 396, 349, 265; 198/480; 104/29, 30, 31, 49, 18–21

[56] References Cited

U.S. PATENT DOCUMENTS

| | | | |
|---|---|---|---|
| 2,773,614 | 12/1956 | Edwards et al. | 414/458 |
| 3,018,496 | 1/1962 | Hosbein | 14/71.7 |
| 3,442,404 | 5/1969 | Pioch | 414/343 X |
| 4,124,129 | 11/1978 | Barry | 414/391 X |
| 4,130,208 | 12/1978 | Barry | 414/334 |
| 4,362,456 | 12/1982 | Barry | 414/337 X |
| 4,370,085 | 1/1983 | Barry | 414/337 |
| 4,370,086 | 1/1983 | Barry | 414/337 |
| 4,425,064 | 1/1984 | Walda et al. | 414/584 X |

FOREIGN PATENT DOCUMENTS

| | | | |
|---|---|---|---|
| 87685 | 3/1957 | Denmark | 414/744 R |
| 391150 | 2/1924 | Fed. Rep. of Germany | 414/396 |
| 3219851 | 12/1983 | Fed. Rep. of Germany | 414/435 |

Primary Examiner—Frank E. Werner

[57] ABSTRACT

A driveway for tractor-trailers is elevated along one side having a side coupling runner mounted to roll on wheels in a track along the side of the driveway facing a single-arm rotary loader. The runner is longer than the tractor-trailer and has a lift push gate at one or both ends for lowering in front of the tractor to push the runner along its track and has recesses for vertical coupling rods or tubes on the loader's trailer-lifting turntable to engage in to move the loader with the tractor to rotate the loader into alignment under the trailer and lift for transfer. Then the tractor driver can release the fifth-wheel and lift the gate and drive away. The loader is further rotated or driven and disengaged from the runner before the runner is returned by motor drive. The loader can load the trailer removed from the tractor onto a railway car as in my earlier U.S. Pat. No. 4,370,086 or onto separable railroad trucks using a second coupling runner which has latches for engaging the railroad trucks to move them with that runner as the trailer is brought over the trucks into position for engaging and supporting the trailer. Cargo containers also can be transferred between trailer beds and railway cars or separable railway trucks using the rotary loader and coupling runners. The loader and runners are operated in reverse to transfer trailers or containers from rail to highway mode. The rotary loader can be mounted on a traveling platform and driven to transfer a trailer or container to or from a stationary spot, a conveyor, or a vehicle, and can angle park trailers and engage angle parked trailers for selective coupling by a highway tractor. The loader and railway cars can be made to handle both trailers and containers.

4 Claims, 8 Drawing Sheets

ROAD-RAIL TRAILER AND CONTAINER TRANSFER SYSTEM

CROSS REFERENCE TO RELATED APPLICATIONS

This application is related to my U.S. Pat. No's. 4,370,085 and 4,370,086 and is directed to improvement and extension of utility of the latter and to less extent relates to several of my other U.S. patents.

Objects of this invention are to eliminate the need for the traveling platform or station car 26 or 26A and station tracks ST or ST' etc., FIGS. 1, 10, and 15 of my U.S. Pat. No. 4,370,086, to reduce the cost of the road-rail intermodal terminal, to reduce the operating cost of the terminal, to enable a tractor operator to load a trailer onto the rotary loader for automatic loading onto a railway car or to hitch and receive a trailer from the loader by driving by, to eliminate the need for the driver to back up into the kingpin when hooking up the trailer, to provide a device moved by the tractor to move the loader to align a trailer for transfer of the trailer or a container thereon.

It is a further object to adapt this device, which I call a coupling runner, to engage and space separable railway trucks for the rotary loader to engage the runner and move them through a transfer run for setting a trailer or container on the trucks or for removing a trailer or container from the trucks according to the direction of movement along the run, thus to reduce train makeup and take-apart time and cost for this carless type of train operation.

It is a further object to provide a fifth-wheel for the road tractor to engage and disengage the trailer's kingpin vertically so the loader can vertically lift and lower the semitrailer to disengage or engage the tractor on a flat driveway and so one driveway and loader can serve for both directions of transfer and thus simplify and reduce the cost of the station installation. It is a further object to provide a terminal with both a road-to-rail and a rail-to-road loader station so a highway tractor can leave a trailer on a first loader and receive one from a second loader by driving along a driveway, and so the first loader supports the trailer while the tractor is uncoupled and driven away and so the second loader turns a trailer into the tractor's fifth wheel from the rear, so the tractor can have the present standard fifth wheel.

It is an object to provide an automatic kingpin lock and opening system for the railway cars for semitrailers which is operated by the vertical coupling rods of the loader to open when one or more coupling recess on the container or trailer berth is engaged by the loader.

While the loader can be as in FIGS. 10–13 of my U.S. Pat. No. 4,370,086, it is an object to provide a parallelogram-arm type loader to eliminate the lifting force on the arm at the pivot post. Parallelogram arms are shown in my U.S. Pat. No. 4,370,085, FIGS. 4, 5, and 22-25 on two-arm rotary loaders. It is an object to provide improved cushioning for this type of arm to apply it to the single-arm loader preferably by eliminating the pivot slot for the load spreader and spring, to minimize the force that the loader applies to the side of vehicles. It is an object to utilize the weight of hinged lift arms which try to straighten and extend the loadspreader, since this force is reduced with travel—whereas a spring increases its force with travel.

It is an object to prevent the side coupling from fouling out in the area for the trains by providing a guard rail for the side coupling to rub against.

It is an object to provide a rotary loader and railway cars which operate therewith for handling both trailers and containers to reduce equipment and operating costs.

It is an object to provide a traveling platform and track for the loader and adapt it for interfacing with conveyors for trailers or containers and/or for interfacing with a trailer parking area for angle parking of trailers.

These other and further objects should become obvious to those skilled in the art by study of this specification with reference to the drawings wherein.

Referring to the drawings and in particular to FIGS. 1-3 and 5-7, a trailer and/or container leaving-and-receiving station 18 has a single-arm rotary loader 20 which connects tangentially between driveway 22 and railway track 24 for transfer of containers and/or semi-trailers 26 between highway tractor 28 on the driveway and a chain of railway container or trailer cars 30. The driveway has a side wall 31 facing the loader to elevate the driveway above the track 24 to approximately deck height of cars 30 on the track. A coupling runner 32 runs on a track 34 along this side of the driveway to connect the tractor-trailer to the loader for a transfer run.

The loader has a vertical pivot post 36 imbeded in a concrete base 37, a load arm 38 pivotally secured to a sleeve 40 supported to turn on the post, and a loadspreader 42 pivotally secured as a turntable on the outer end of the arm. Arm 38 comprises a bracket 44 and equal parallel arm members 46 pivotally connected and spaced apart one above the other between the sleeve and the load bracket to form a vertical parallelogram linkage which holds the loadspreader horizontal. Brackets 44 has a wheel 48 which supports arm 38 to run on cam track 50 concentric around post 36. The cam track has slopes 52 and 53 to lift and lower the loader for transfer.

The loader is driven by an electric or hydraulic motor 56 through reduction gear 57 and electric clutch 58 connected to drive wheel 48 or a drive wheel 60 which has spokes 61 protruding into a circular ladder track 62 concentric about the pivot post as in FIG. 10 of my U.S. Pat. No. 4,362,456 to help the loader index the chain of railway cars 30 to load or unload one spot or berth at a time. The electric clutch is provided to disconnect or slip the drive to stop the loader when it engages with the runner or the loader's drive can be disengaged as in my U.S. Pat. No. 4,362,456, FIGS. 11, 14-16 for the transfer run along which it is moved by the tractor.

The loadspreader 42 is supported on arm 38 to move radially relative to the pivot post by means such as a central pin 64 secured depending from the loadspreader through a slot 66 parallel to the arm and secured to a horizontal plate or disc 68 under bracket 44 to thus form a turntable with the loadspreader. Low friction plastic liners between the loadspreader and bracket 44 and disc 68 reduce friction so the loadspreader can slide on the bracket arm even under load, or a construction such as described with FIGS. 23-25 could be used. The loadspreader is a turntable with a short side 70 with pad 71 for supporting and locating the far side of a trailer or container and a long side 72 (as long as the trailer) above the bottom of the trailer along the near side and having a central pad 73 and end supporting pads 74 extending under for supporting and locating the near side of the trailer or container facing the loader.

Figure 1:
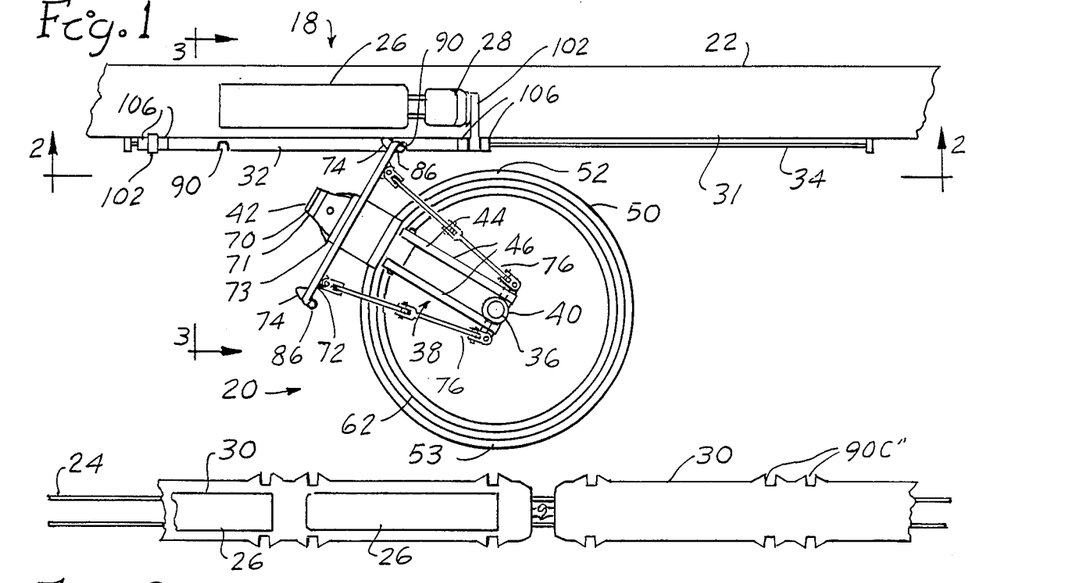
FIG. 1 is a plan view of a rotary loader station for interchange of semitrailers between truck and rail. It can also handle containers.
Figure 2:
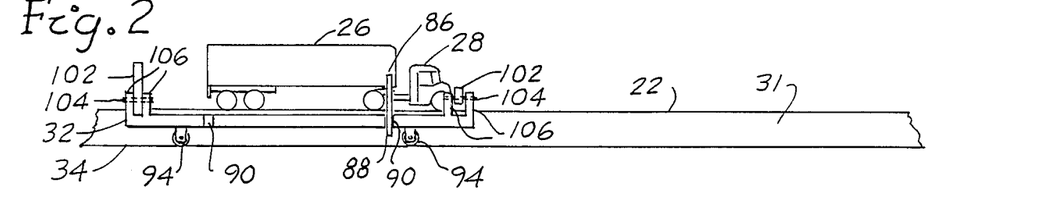
FIG. 2 is a front elevation section taken on line 2—2 of FIG. 1.
Figure 3:
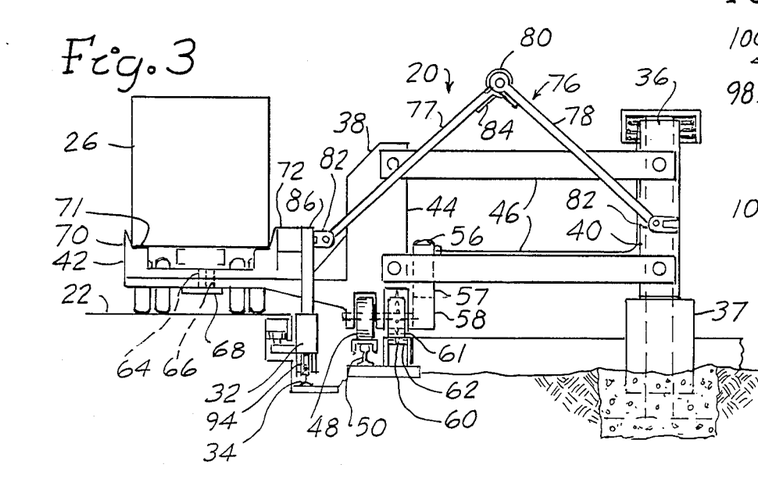
FIG. 3 is a elevation view of the loader taken on line 3—3 of FIG. 1 but after the loader is moved under and supports the trailer.
Figure 4:
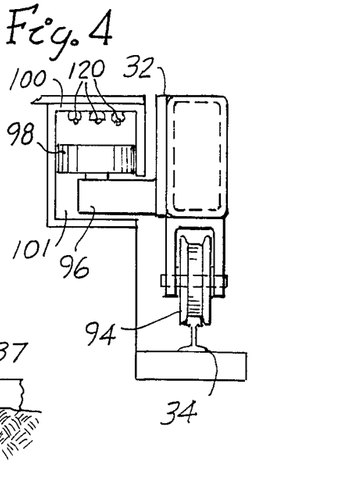
FIG. 4 is an end view of the coupling runner to a larger scale than in FIG. 3.
Figures 5, 6, 7:
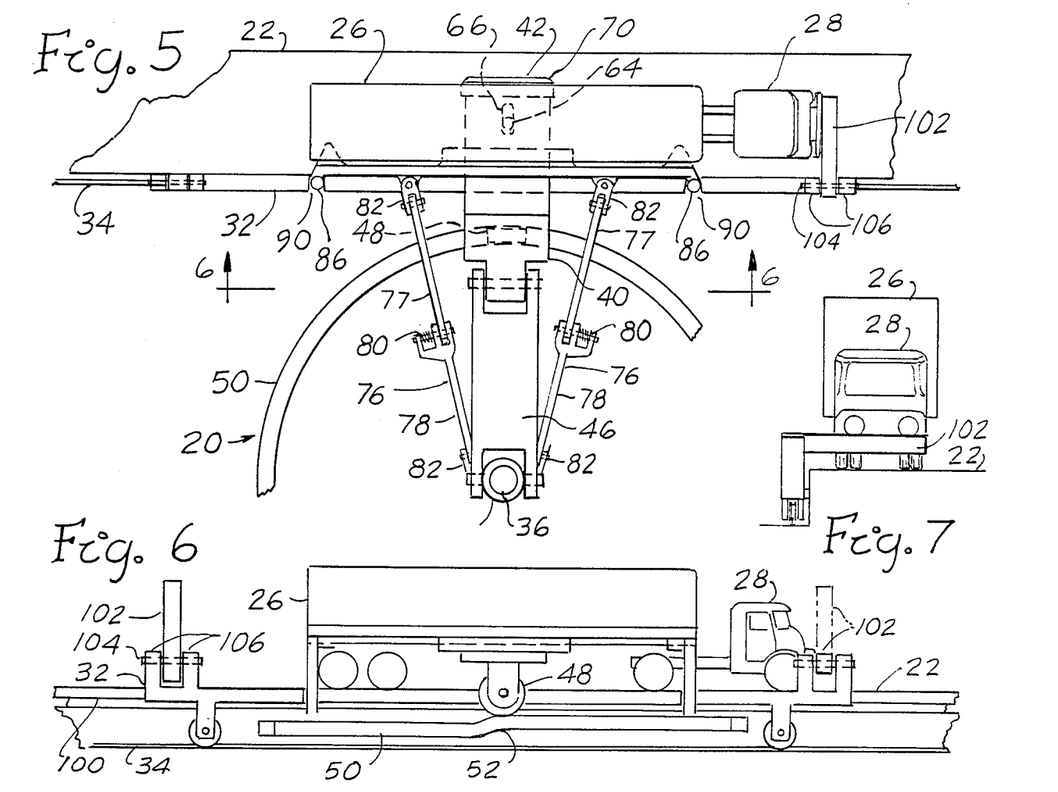
FIG. 5 is a plan view of the loader supporting the trailer at tangency with the driveway where the tractor is released from the trailer.
FIG. 6 is an elevation section taken on line 6—6 of FIG. 5.
FIG. 7 is a front view of the tractor-trailer on the driveway.
Figure 8:
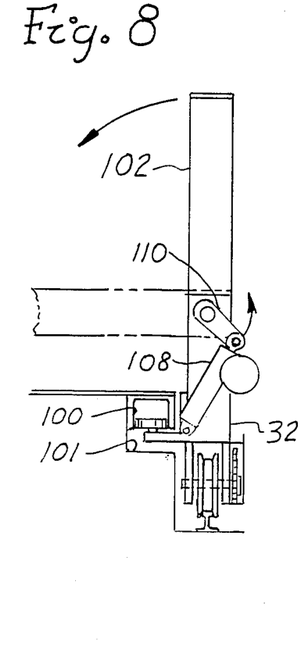
FIG. 8 is an end view of the coupling runner along side of the driveway.
Figure 9:
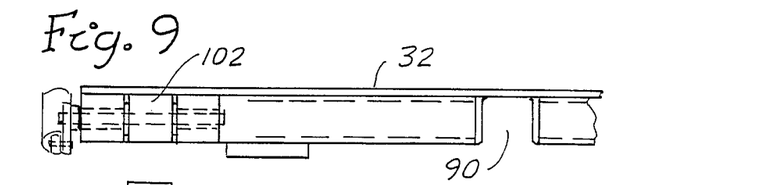
FIGS. 9 and 10 are respectively plan and side elevations of an end of the coupling runner.
Figure 10:
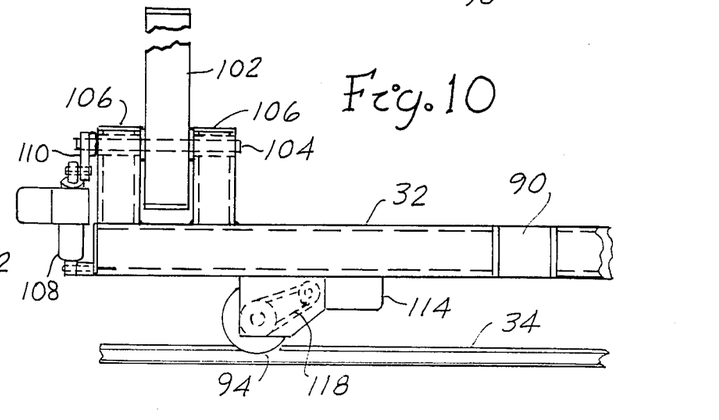

The loadspreader is normally held extended on and at 90° to arm 38 as in FIG. 1 by two extension arms 76 each connecting an end of the loadspreader to sleeve 40. Arms 76 are shown here as each having two arm members 77 and 78 hinged together at 80 at the middle and sloping down therefrom each way to pivot brackets 82 to fold up and down in vertical planes between sleeve 40 and the loadspreader. A coil spring 84 at hinge 80 forces the arms toward straightening, helped by their weight, to provide a force to align and extend to the loadspreader on arm 38.

The loadspreader has vertical coupling fingers 86 of round rod or tubing, one on each end of the long side 72, preferably each including a roller 88 to roll on smooth sides of the vehicles and into coupling pockets 90 on on the vehicles (cars, coupling runners, and container trailers) rotating the loadspreader turntable against the restoring force of lifted arms 76.

The coupling runner 32, FIGS. 1, 2, and 4-10, is longer than the tractor-trailer. It can be made of a steel flat covered on one side by lengths of rectangular tubing welded thereto with spaces between the tubes forming the coupling pockets 90. The runner has a smooth outer face for the loader's coupling fingers or tubes 86 to slide or roll on and enter slots 90 spaced at the same distance apart as the coupling tubes 86. Each slot 90 is slightly larger than the diameter of the coupling roller 88, is tapered toward the side opening, and is at least half as deep as the diameter of roller 88. The runner has a grooved supporting wheel 94 mounted under each end to run on track 34 and a bracket arm 96 at each end supporting a horizontal wheel 98 to roll in a channel 100 positioned legs down in a recess 101 along wall 31 to brace the runner upright.

A push gate 102 is secured to each end of the runner for the tractor's front bumper to engage and push the runner and move the loader engaged with the runner to rotate the loadspreader under the trailer (or container on a drop-center trailer) to align and lift on slope 52. The gates could swing sideways or be the lift type shown. Each gate 102 is secured on a shaft 104 between bearings on posts 106. Either type of gate could have adjustments for different lengths of tractors. Lift gate 102 is lifted and lowered by an electric actuator 108 (an electrically driven gear and rack) connected between a crank arm 110 secured on shaft 104 and the outer bearing post; see FIGS. 8-10.

The runner is moved by the tractor pushing on a gate 102 and is returned to its starting position (if the next transfer is to be in the same direction) by a reversible electric motor 114 connected through a speed reducer, electric clutch and chain drive 118 to a wheel 94. this electric clutch disengages drive wheel 94 from motor 114 and the reducer to free the runner to be moved by the tractor except when the motor is returning the runner. Power rails 120 are run in channel 100 along wall 31 and engaged by contactors on the runner to operate motor 114 and actuator for gates 102 controlled by limit switches as desired.

OPERATION TO TRANSFER TRAILER FROM TRACTOR TO RAILWAY CAR

With the left-hand gate 102 up and the right-hand gate down, the tractor with trailer is driven from the left to engage its front bumper with the right-hand gate. If the loader is not engaged in the right-hand slot 90 of the coupling runner a limit switch engaged on the forward gate starts the loader to engage its forward coupling tube 86 in the forward coupling slot 90. A mirror can help the driver know when the loader is coupled to the runner. Then the driver drives along the driveway pushing the gate, moving the runner, pulling the loader clockwise around on its track and turning the turntable loadspreader to align under the semitrailer. Cam lift slope 52 in track 50 lifts arm 38, lifting the loadspreader to engage the bottom at the sides of the trailer and slightly lift it (but not enough for the kingpin of the trailer to be lifted in the fifth wheel) at tangency, FIGS. 5-6, where the driver stops at a sign to disconnect and release brakes and electrical lines, open the fifth-wheel lock and gate 102 and drive away.

After the tractor is driven away the loader is driven clockwise by its motor, moving the runner until the rear coupling tube 86 is cleared from the runner. The loader then is stopped to wait for a car to load, or when the car is positioned ready as in FIG. 1 the loader continues and engages its forward coupling tube with the car behind the forward coupling pocket or latches 90C" similarly as on the runner. Continued turning of the loader brings the tube 86 from behind the forward latch pocket 90C to latch into it and move the cars to the left one trailer length centers pitch. During this movement of the car the loader aligns the trailer over the car before slope 53 (down) in cam track 50 lowers the loadspreader to set the trailer into position with its kingpin engaging in an open kingpin clamp on the car.

The loader of FIGS. 1-10 can be operated in the reverse direction to remove a trailer from a car and connect the trailer on the loader to a tractor driven from right to left. The loader brings the trailer with brakes released to the driveway at a height so the kingpin will engage the fifth wheel from the rear. The tractor driver engaging the left-hand gate 102 moves the runner, moving the loader, which aligns the tractor with the driveway, lowers, and turns out from under the trailer.

IMPROVEMENTS WITH SPECIAL DETAILS: SPECIAL FIFTH WHEEL

To prevent the trailer wheels from engaging the driveway while moving on the loader and so the trailer brakes can be on, a special fifth wheel 124, shown in FIGS. 11-15, is provided for tractor 28. It is designed to open to receive the kingpin 126 from above or behind so the trailer can be transferred vertically and turned to or from alignment with its wheels clear above the driveway. A cam track 50L with profile as in FIG. 21 has a step 128 between two slopes 52 up to the right. The loader aligns the trailer kingpin over the tractor's special fifth wheel along this slope-step-slope for vertical transfer of the kingpin to or from the special fifth wheel according to whether the tractor is driven to the right or left respectively along the driveway. The tractor is stopped with the loader wheel 48 on step 128 to unlock or lock the fifth wheel and uncouple or couple brake and electrical lines.

Referring to FIGS. 11-15, special fifth wheel 124 has two opposite kingpin holding plates 130 and 132 hinged together on pin 133 secured to a support plate 134 to teeter on pins 136 suppored by the usual mounting plate 137. Plates 130 and 132 are shaped like two halves of a fifth-wheel plate and are tapered to be apart at the rear to guide the kingpin into position when open and can receive the kingpin from above. Plates 130 and 132 close to overlap behind and with slip fit around the kingpin. Plates 130 and 132 are connected by toggle links 140 to air cylinder 142 to open when the cylinder is pressured. A spring 144 in cylinder 142 closes the plates around the king pin.

SPECIAL KINGPIN COUPLERS FOR RAILWAY CARS

Figures 11, 12, 13, 14, 15, 16, 17, 18, 19:
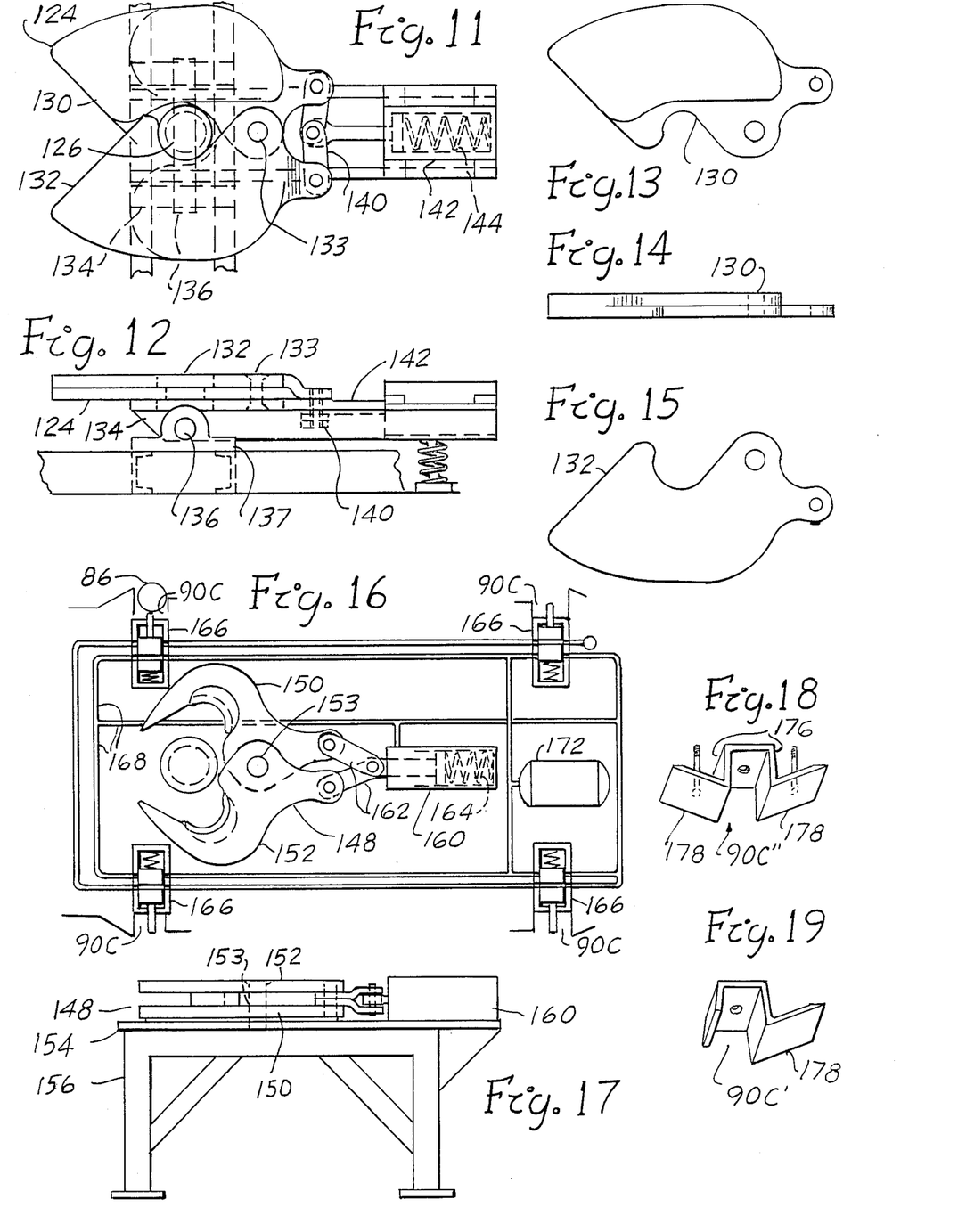
FIGS. 11 and 12 are respectively plan and side views of a special fifth wheel on the tractor.
FIGS. 13 and 14 are respectively plan and side views of a plate of the fifth wheel.
FIG. 15 is a plan view of the cooperating plate for the plate of FIGS. 13 and 14.
FIGS. 16 and 17 are respectively plan and side views of a kingpin lock and stand for the railway car with operating controls schematically shown in FIG. 16.
FIGS. 18 and 19 are two variations of side coupling latch pockets for the railway cars, container bed trailers, and for coupling runners.

Railway cars 30 will have special kingpin couplers 148, FIGS. 16-17, which are opened by the side coupling rod 86 engaging in any of four pockets 90C for each trailer berth on the cars. This coupler has two plates 150 and 152 hinged together on pin 153 secured to a base plate 154 on a coupling stand 156 which mounts on the deck of the car. An air cylinder 160 has its rod end connected by two links 162 to each plate 150 and 152 to open the plates as shown in FIG. 16 when the rod end of cylinder 160 is pressured and to be toggle closed around the kingpin by the force of spring 164 in cyliner 160.

There are two coupling pockets 90C for each load berth on each side of cars 30 each with a spring extended plunger type valve 166 whose rod end extends into the coupling pocket 90C horizontally from the side of the vehicle so the valve's plunger is pushed in by a coupling rod 86 when in that pocket. Air lines 168 connect the rod end of cylinder 160 through the four valves in series to exhaust when all plungers are extended. Normally closed ports of these valves are connected in parallel between the rod end of cylinder 160 and air pressure tank 172 so the kingpin lock is only opened when the plunger of one or more of these valves is pushed in, which the coupling rods 86 do to open the kingpin coupler 148 for transfer of a trailer to or from the berth on the car or vehicle.

SPECIAL COUPLING POCKETS

Figure 26:
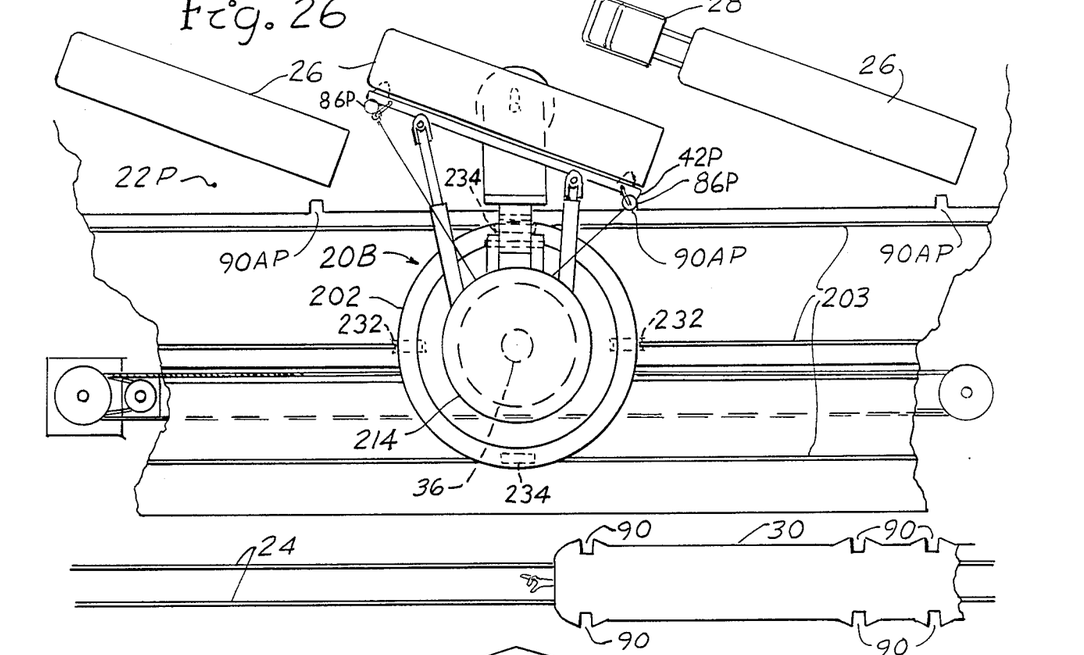
FIGS. 26 and 27 are respectively plan and side elevation views of a station having a traveling platform mounted loader for oblique positioning of trailers.
Figure 31:
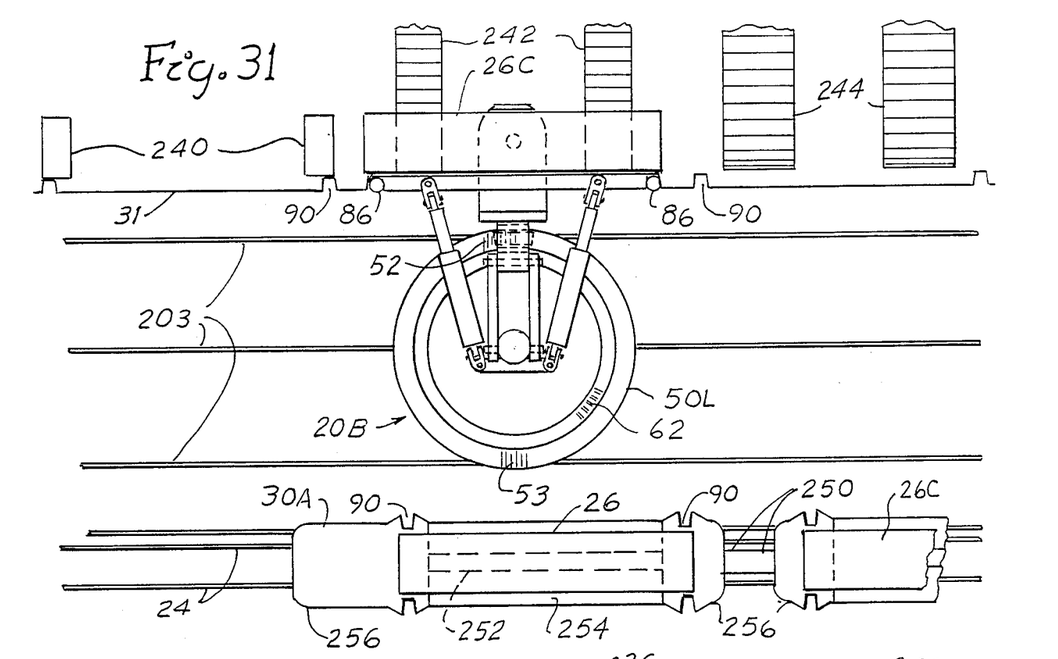
FIG. 31 is a plan view of a station with a traveling platform loader and a railway car for handling trailers and/or cargo containers.

If the railway car is too narrow for flush coupling pockets recessed in the sides, pocket pieces 90C", FIG. 18, are provided to be recessed into shallow openings and extend out from the car side as in FIGS. 1, 26, and 31. Each pocket piece 90C" is a channel section with legs 176 tapered apart slightly and a wing 178 along each leg extending out and back to feather into the side of the car. The pocket piece 90C', FIG. 19, has only one latching wing 178 for coupling only for the loader to engage and move the car (and not for the car to engage the loader), and is shown applied in FIG. 20. The pocket pieces can be mounted in rubber or other resilient material to cushion coupling and deaden sound. Other pockets can be of the moveable latch type as in FIG. 38 or as in my earlier patents.

VARIATIONS

Corresponding parts of variations are given the same number if the same or a suffix is added if the part is modified enough to mention.

A TWO-LOADER TERMINAL

Figure 20:
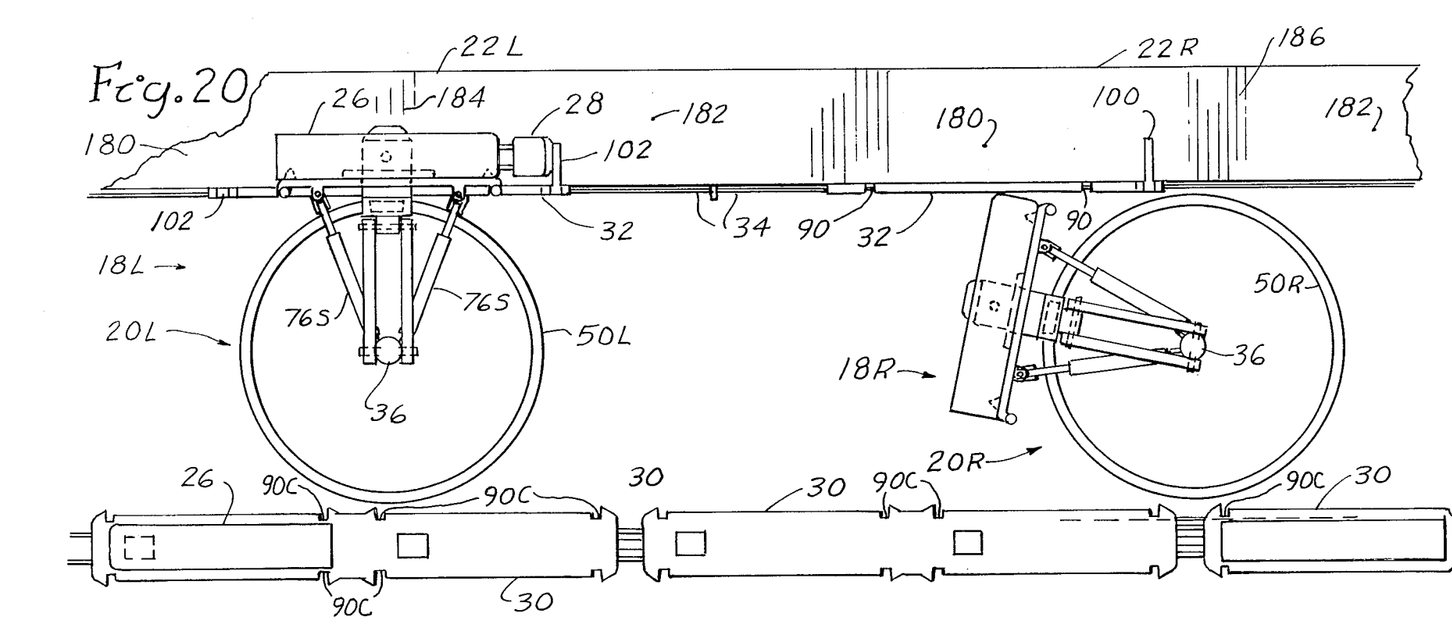
FIG. 20 is a plan view of a two-station terminal having separate loaders for unloading and reloading the railway cars in succession.
Figure 21:
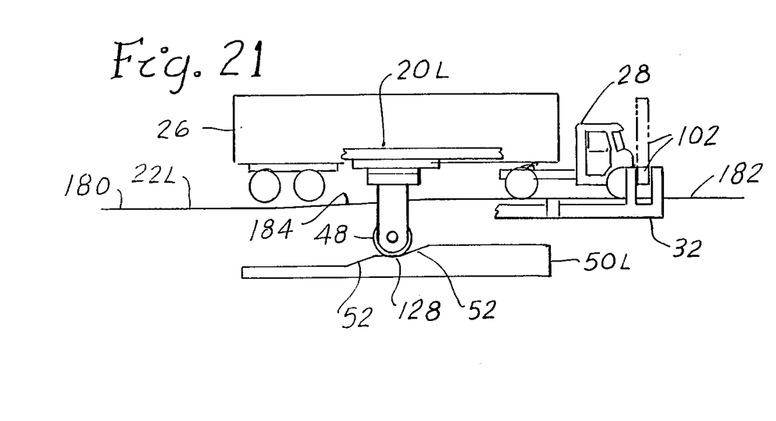
FIGS. 21 and 22 are side elevations of the tractor-trailer in respectively the trailer unhitching and hitching stations of FIG. 20 to a larger scale and at the point of tangency with the loader represented schematically.
Figure 22:
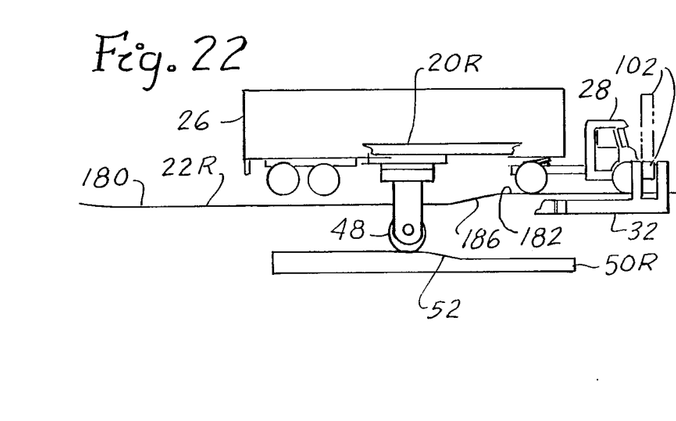

The terminal, FIGS. 20–22, for trailers with either the standard or the special fifth wheel, has a trailer leaving station 18L and a trailer receiving station 18R with respectively clockwise rotary loaders 20L and 20R, so a driver driving left to right along driveway transfer runs 22L and 22R can deliver a trailer to the first loader 20L and receive a trailer from the second loader 20R. Each driveway 22L and 22R has two successive levels, a low level 180 on the left and a higher level 182 on the right of tangency where a slope 184 connects the two levels of station 18L and a shorter incline 186 connects the two levels of driveway 22R. Level 182 is at the same height as driveway 22. These lowered approaches ahead of tangency along the driveways are for the loaders to hold the trailers' wheels above the driveway while the tractor is at the right height for uncoupling or coupling the standard fifth wheel and so the trailer wheels will not rub the driveway when a loader with trailer is turned from or to the driveway.

Loaders 20L and 20R are the same as loader 20 basically except for their cam tracks respectively 50L and 50R. Cam track 50L, FIG. 21, as described has step 128 between slopes 52 up, whereon the loader holds the traler it has lifted as shown, so its rear wheels clear the driveway when uncoupled from the trailer and the gate is lifted and the tractor driven away. The higher slope 52 lifts the trailer further so its wheels clear the high end of the driveway where the tractor is shown. The cam track 50R for loader 20R, FIG. 22, is the reverse profile of that at stations 18 and 18L, since the high side at station 18R is at the right to carry the trailer clockwise around over level 180 of the driveway for its kingpin to horizontally enter the fifth wheel from the rear of the tractor which is on level 182. Loaders 18L and 18R are shown with telescoping spring extended tubular arms 76S, replacing arms 76 as a variation.

Loaders 20L and 20R are spaced apart for clearance between runners 32 and so a chain of railway cars 30 on track 24 past the loaders can be positioned for both loaders to engage before moving the cars. Containers or trailers on cars 30 at the right are engaged and removed by loader 20R moving the cars one load berth span to the left, which feeds the empty cars for loading to loader 20L in position for side coupling by that loader. When enough spots on cars 30 are unloaded so loader 20L has a car in position to load then both loaders are controlled to wait until both loaders are ready to engage cars in the chain and move them simultaneously so all spots can be emptied and reloaded. The coupling tolerance between loader and car is over ten feet at full scale, the coupled tolerance less than one inch.

PREFERRED LOADER ARMS

Figure 23:
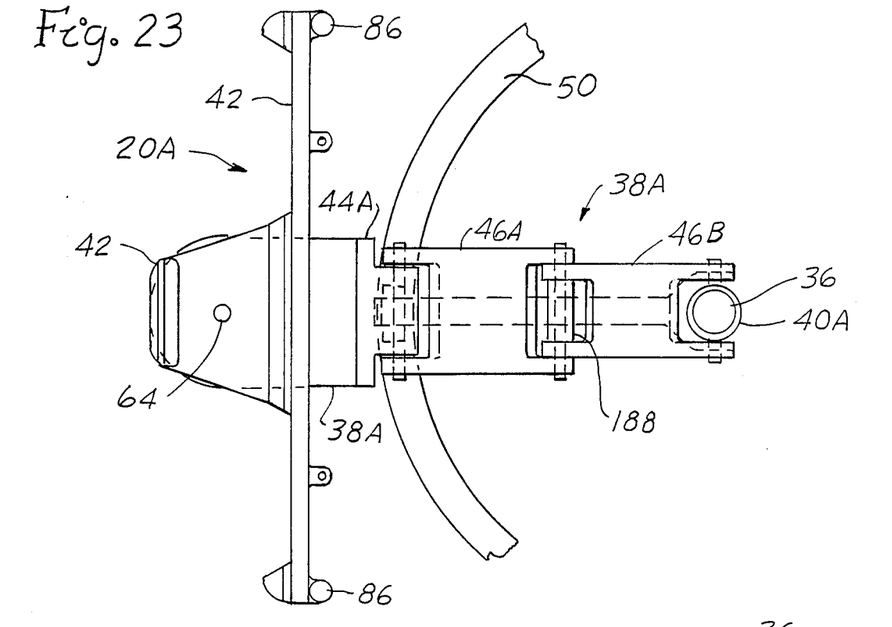
FIGS. 23 and 24 are respectively plan and end elevation views of the loader having preferred construction details.
Figure 24:
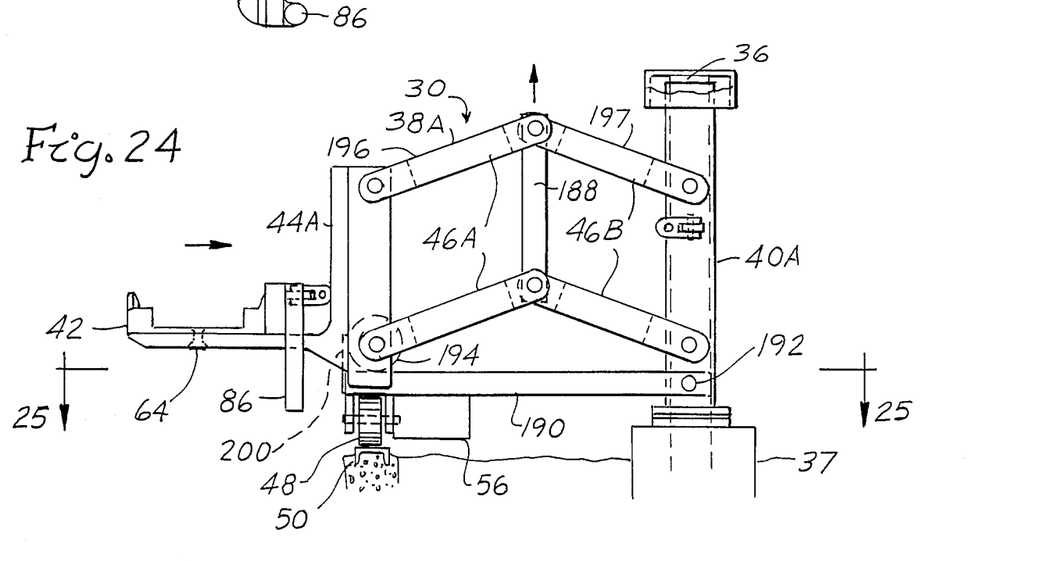
Figure 25:
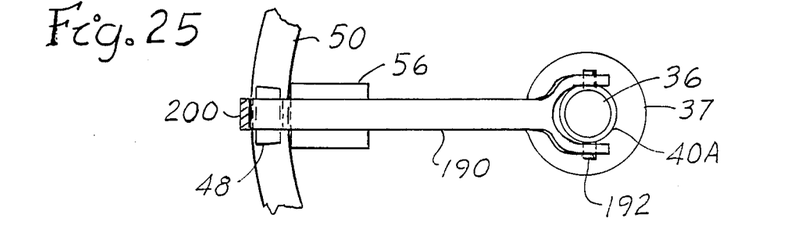
FIG. 25 is a section taken on line 25—25 of FIG. 24.

Referring to FIGS. 23–25 for details of the preferred loader 20A which eliminates the slot 66 in arm 38. The turntable 42 is pivotally secured on pin 64 to arm 38A in a round hole 66A instead of a slot, and the cushioning of the loadspreader against the runner, vehicle, or runway is provided by using an arm 38A of double parallelogram linkage wherein a central vertical connecting member 188 is raised when the loadspreader is pushed against a vehicle and whose weight forces the load arm to extend back out when the force is relieved.

This loader has a radial track arm 190 pivotally mounted on pins 192 to sleeve 40A on column 36 at one end and supported by a conical wheel 48 on track 50 at the outer end of arm 190. Arm 190 supports arm 38A which has a roller or wheel 194 to roll radially on arm 190 and has an outer and an inner parallelogram linkage in the plane of the arm. The outer linkage 196 includes the oad bracket 44A and top and bottom parallel arms 46A connected by vertical member 188. The inner linkage 197 includes a top and bottom parallel arm 46B connecting member 188 to tube 40A. Arms 46A and 46B slope up to member 188 whose weight extends arm 38A outward on track arm 190 to a stop 200. This eliminates need for one or more springs and the slot 66 to extend the loadspreader 42 out on arm 38A with restoring force which diminishes as the arm is retracted—whereas a spring would increase in force as it is compressed. The loadspreader 42 is held resiliently at 90° to arm 38A by an arm 76 or 76S on each side as in FIGS. 3 and 5, or 20 with springs of less force than if they have to slide the spreader out on bracket 44.

TRACK MOUNTED LOADER FOR ANGLE PARKING TRAILERS

Figure 27:
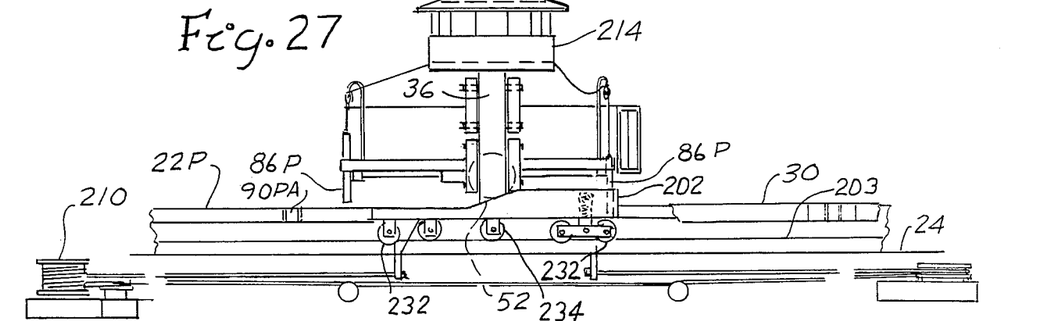

Referring to FIGS. 26–27, trailers 26 are parked obliquely as shown by a tractor 28 or by the loader 20B mounted on a traveling bed 202 mounted on wheels to operate along three-rail track 203 parallel to railway track 24 on one side and a raised parking area 22P on the opposite side of track 203. The side of the parking area facing the loader's track has coupling slots 90AP spaced one per parking spot for pivoting the loadspreader about the right-hand coupling rod 86P to align a parking spot at about 20° turned from the tracks when lifted and lowered by slope 52 for a transfer. A cable drive 210 moves the loader as required with manual control from the ground or by radio control from a cab 214 secured atop column 36 secured to bed 202.

Figure 28:
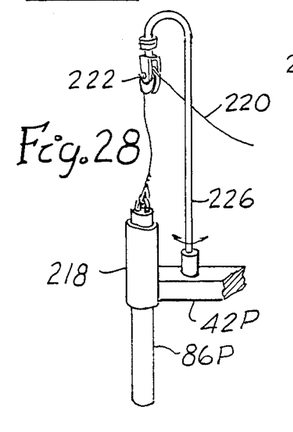
FIGS. 28 and 29 are details in perspective of a lift for the coupling rod on the loader of FIGS. 26 and 27 to larger scale in respectively lowered and lifted positions.
Figure 29:
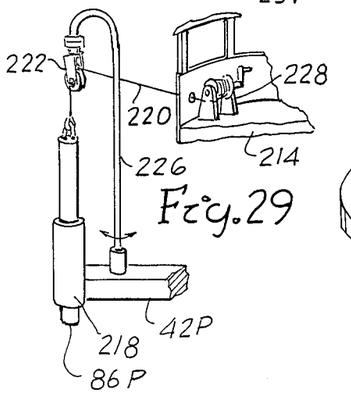

The loader has at least one of its coupling rods 86P mounted to be lifted; see FIGS. 28 and 29. The rod 86P extends through and slides in a sleeve 218 secured to the loadspreader 42P. The top end of rod 86P is connected to a rope 220 which runs up over sheave 222 swivelly supported from an arm or curved neck of pole 226 on the outer end of the inner side of the loadspreader 42P. The rope is run to a winch 228 inside cab 214. The rod 86P is lifted to run or clear over the parking area as shown in FIGS. 26 and 27.

Figure 30:
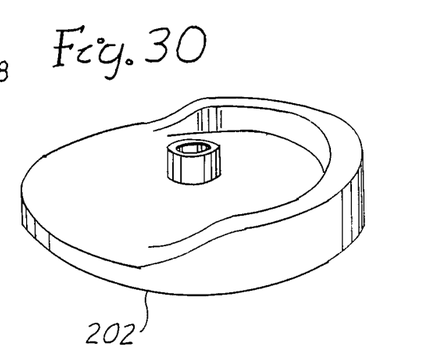
FIG. 30 is a perspective view of the traveling platform for the loader.

Referring to FIGS. 26, 27 and 30, the base 202 of the loader 20B has two grooved wheel assemblies 232 for engaging and tracking the center rail of track 203, one of these being backed by a spring. The base has a wheel 234 mounted to run on each outside rail of track 203.

The loader handles semitrailers 26 placing them on the parking area at an angle of about 20° to the tracks so a tractor 28 can attach to the front of any trailer so parked and so the loader can remove or add a trailer to any parking spot without disturbing adjacent trailers.

STATION FOR TRANSFER OF CONTAINER OR TRAILER BETWEEN A STORAGE SPOT OR CONVEYOR AND RAIL

Figure 32:
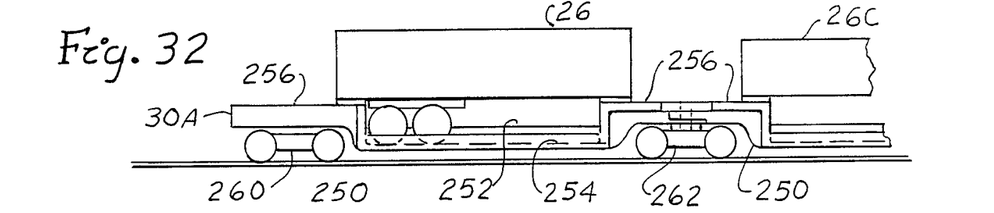
FIG. 32 is partial side view of the loaded railway car in FIG. 31.

Referring to FIGS. 31–32, the traveling loader 20B can also transfer cargo containers 26C between station pedestals 240 or set across two runs of a slat conveyor 242 or transfer a trailer 26 to and from a slat conveyor 244 which has slats flush with the driveway so the trailer can be driven on or off. The loader engages rods 86 in pockets 90 along the side of the retaining wall 31 to locate the loadspreader for transfer.

SPECIAL RAILWAY CARS FOR CONTAINERS AND/OR TRAILERS

Railway car 30 can be designed to carry containers and/or trailers and is preferably articulated as car 30A, FIGS. 31-32, having a series of articulated frames 250 with depressed center sill 252 and lower decking 254 for supporting the wheels of the trailer if desired. The frame has end pedestals 256 with locators for engaging a trailer 26 or a container 26C and is supported on the usual railway trucks 260 at each end and on trucks 262 with articulated pin connections between the frames. The trailers and containers can have locking, locating, and clearance holes as needed.

STATION FOR TRANSFER OF CONTAINERS TO AND FROM DEPRESSED CENTER TRAILER BEDS

Figure 33:
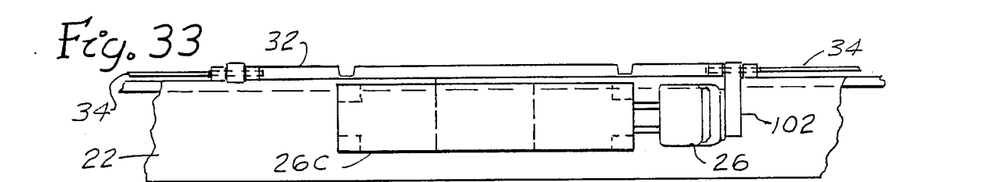
FIGS. 33 and 34 are respectively a plan and elevation views of a variation for replacing either transfer run in FIGS. 31 and 32 with a transfer run for the tractor-trailer shown having a depressed-center bed for a cargo container.
Figure 34:
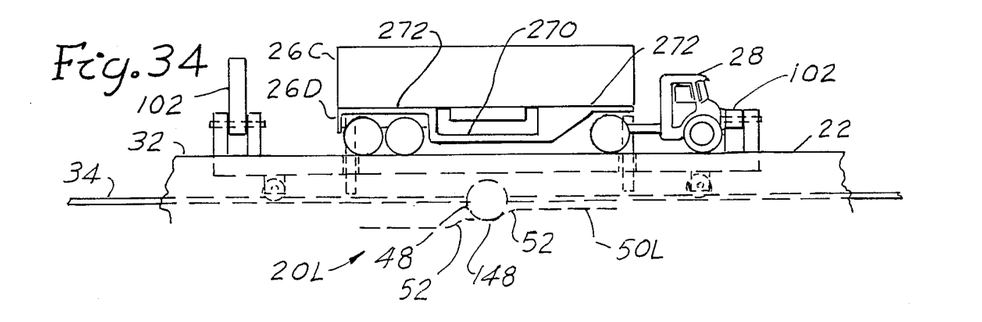
Figure 35:
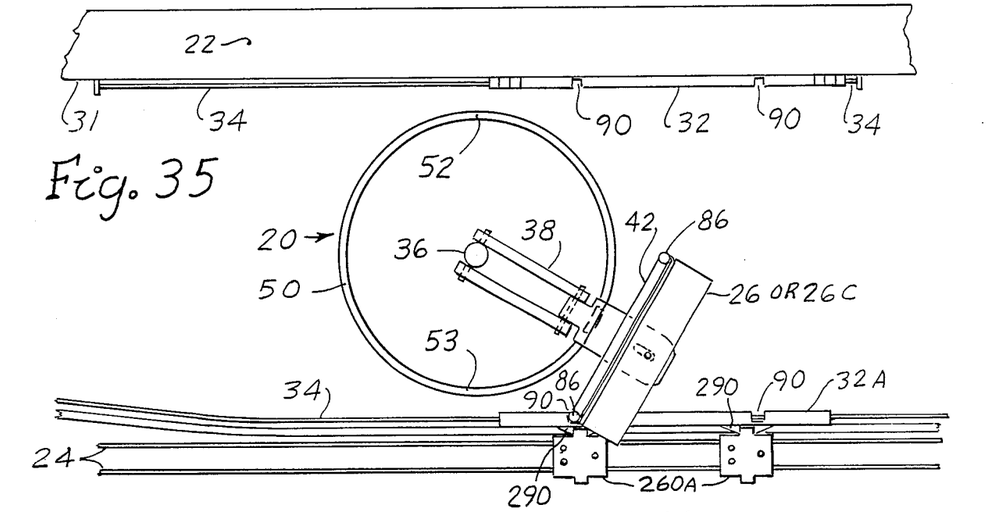
FIG. 35 is a station plan with the rotary loader for transfer of containers between the driveway for the depressed-center trailer and a railway track with separable railway trucks for supporting and and coupling either the containers or trailers into a train. The loader and driveway can also be used for transfer of trailers.

Referring to FIGS. 33 and 34, either of the runs past the traveling loader 20B, FIG. 31, can be replaced or re-extended to include a driveway 22 for trailers 26 as in FIG. 1 or 21 or for containers 26C on tralers 26D, FIGS. 33-34. Trailers 26D have a depressed center sill 270 with end platforms 272 for a container 26C. Sill 270 connecting the ends of the trailer can be low, broad, thin, and flexible to increase space for the loader. The trailer has openings at the corners for the end pads on the loadspreader to enter under the container.

A transfer run 22 for containers 26C on trailers 26D is preferably past a loader 20L with a stationary pivot post (FIG. 21) or the pivot post of a traveling loader 20B (FIG. 31) can be held stationary for this transfer. A cam track 50L, station 18L, FIG. 21, will give more than enough lift and this station can handle containers. Cam track 50L, FIG. 34, also has lift slopes 52 to lift the container from or to the trailer along a flat driveway 22 for transfer in either direction. The cam track 50L with a slope 52 each side of a step 128 will handle either a container or trailer. It is hard to stop and hold a loader on a slope for unlocking a fifth wheel etc., therefore step 128 is added for this stop but is not needed or desired for containers only.

Referring to FIGS. 20, 21, and 34 a driver with a container need only drive a little further to the right from the position shown (tangency) to get the additional lift to have the loader lift the container clear of the trailer and can continue to drive to turn the loader and container thereon out from over the driveway and out from the runner before the operator lifts the gate 102 to drive away. The loader is operated in reverse to load a container on the trailer moved right to left on the same driveway. The operator clears the loader from under the container before stopping to lift the left-hand gate 102 to drive away.

STATION FOR TRANSFER OF CONTAINERS OR TRAILERS TO AND/OR FROM RAILWAY TRUCKS

Referring to FIGS. 35-39, either a traveling or stationary mounted loader 20 connects between a trailer driveway 22, 22L, or 22R as in FIGS. 1, 5, 20, or 33, or traler or container storage areas as in FIGS. 26 or 31 and a container and/or trailer train assembly/disassembly track 24 wherein separable railway trucks 260A having coupling pins 280 for receiving containers or trailers are made up into trains or taken apart with the rotary loader.

Figures 36, 37, 38:
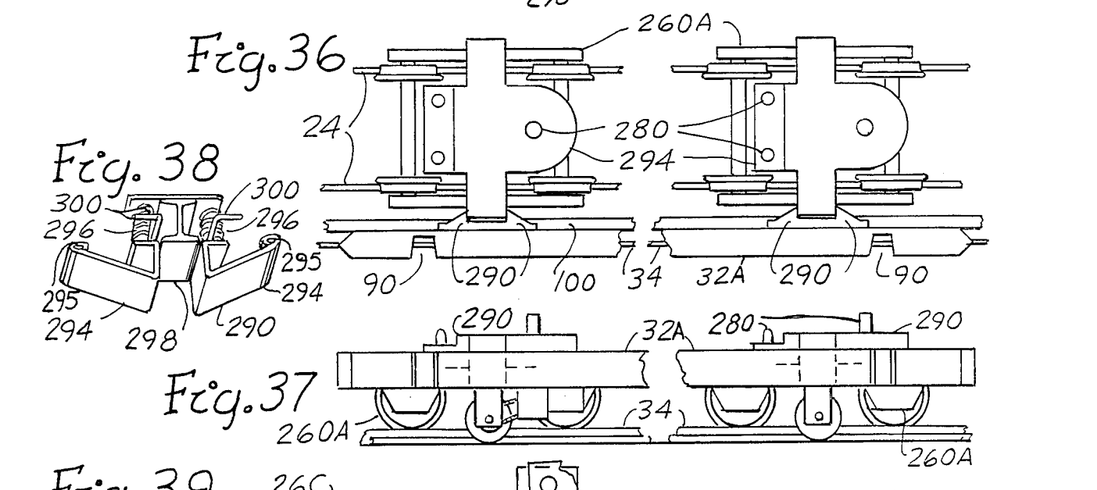
FIGS. 36 and 37 are respectively broken plan and side elevation views of the coupling runner positioning railway trucks to receive a container or trailer from the loader of FIG. 35 as seen from the loader's side to a larger scale.
FIG. 38 is an oblique view of a side coupling latch for the coupling runner.

A coupling runner 32A on track 34 along the side of track 24 facing the loader 20 has coupling pockets 90 facing the loader for coupling with rods 86 on the loadspreader of loader 20 and has two sets of latches 290 on the side facing track 24 for engaging a truck 260A with each set of latches 290. Each pair of latches 290 are preferably designed to engage the truck's upper spring bolster 294 in a pocket formed between the latches 290 as shown in FIG. 36. The sets of latches are spaced to position the trucks 260A to receive a container or trailer on pins 280 of the trucks and spaced in relation to latch pockets 90 to align the loader to align a trailer or container on the loader over the pins to set down or lift off to make up or take apart a train of trailers or containers on trucks 260A. The latch set as shown in FIG. 38 has two check shaped face pieces 294 hinge mounted at 295 to the rider and each extended by a spring 296 to form a pocket having a fixed wall 298. Either face piece can recess flush with the side of the rider to latch the bolster into this side coupling pocket. The tracks 24 and 34 can run apart to free the trucks or the latches can be recessed by a handle 300 to push in and catch in a dent to hold in to free the trucks from the runner after loading or unloading a container or trailer on the trucks. A channel 100 turned legs down is supported along the runner's track, and the runner has a bracket arm 96, as in FIG. 4, supporting horizontal wheel 98 at each end of the runner to run between the legs of the channel 100 to brace the runner along its track 34A. Gates 102 are omitted since they are not needed on runner 32A. The runner is returned to engage two more trucks 260A to load or unload the next container or trailer thereon.

SPECIAL LOADSPREADER FOR CONTAINERS

Figures 39, 40:
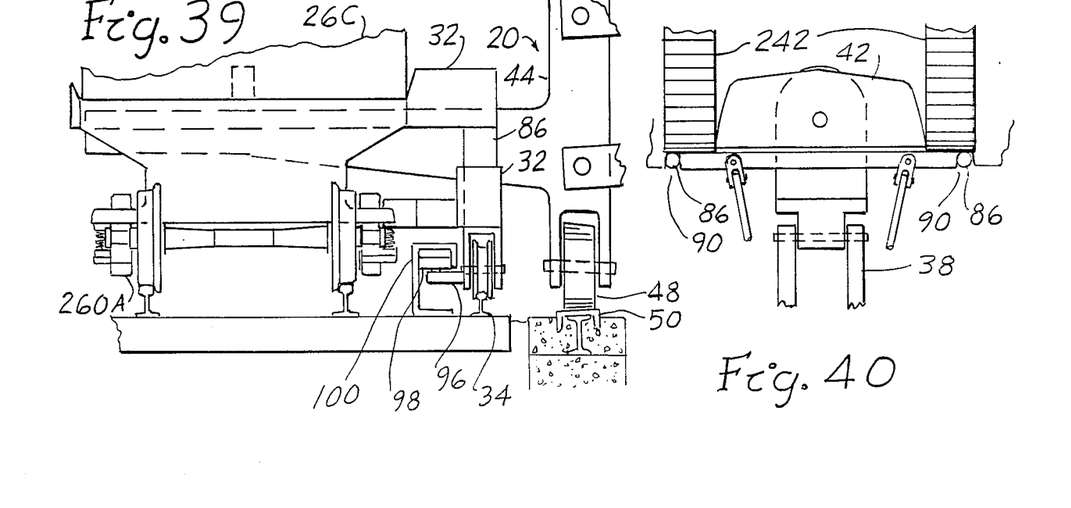
FIG. 39 is an end and sectional view taken on line 39—39 of FIG. 37 to a larger scale.
FIG. 40 is a plan view of a portion of the loader with a loadspreader for engaging the container, shown between sides of a slat conveyor for the containers.

If only containers or pallets are to be handled, the loadspreader can be as shown in FIG. 40. If the loadspreader is on a loader mounted to travel, the loader can transfer the container to a conveyor as shown.

Having thus described some embodiments of my invention, it is understood that the invention is not limited to the embodiments disclosed since it may receive a variety of embodiments and applications which can become apparent to those skilled in the art by study hereof. Therefore it is understood that various changes, modifications, and adaptations may be made therein within the scope of the appended claims without departing from the spirit and scope of my invention.

I claim as my invention:

1. In a system for use with a highway operable vehicle of the type used to haul a load, said system allowing the vehicle to operate a rotary loader to transfer the load between the vehicle and the loader, said loader being of the type having a turntable loadspreader mounted to turn horizontally on the radial end of a load support arm that rotates horizontally about a pivot to load or unload the highway vehicle; said system including in combination a driveway for the vehicle, a track and a coupling runner mounted to travel on said track along the side of said driveway facing said loader, retractable means on said runner for extending over said driveway for engaging said highway vehicle on said driveway with said runner for moving said runner along said track by driving said highway vehicle or to retract and permit the vehicle to pass thereby, said rotary loader having said pivot spaced from said side for said loader to make a transfer arc over said driveway, coupling means for engaging and aligning said rotary loader with said runner for moving said loader with said coupling runner when said retractable means is moved by said vehicle in alignment for the loader to transfer a load between said loadspreader and said vehicle.

2. A system as in claim 1, said coupling means being a finger on each end of the load spreader turntable, said coupling runner being longer than said loadspreader and having a pocket spaced for said coupling finger on each end of the loadspreader to engage in, said runner having a sufficiently smooth face for these fingers to run on to guide the forward finger into the forward said pocket.

3. A system as in claim 2 said driveway having a retaining wall along said side said track including a channel recessed in along the side of said retaining wall facing the loader.

4. A system as in claim 1, said vehicle being a semi-trailer tractor having a front bumper, said means for engaging being a push gate mounted to be swung out over the driveway to be engaged by the front bumper of said tractor to push against, and means for opening said gate for said tractor to drive by after receiving or leaving a load on said loader.

* * * * *